United States Patent [19]
Weber

[11] 3,898,319
[45] Aug. 5, 1975

[54] PROCESS FOR PREPARING ZEOLITE Y

[75] Inventor: Willis Wilmer Weber, South Salem, N.Y.

[73] Assignee: Union Carbide Corporation, New York, N.Y.

[22] Filed: Apr. 1, 1974

[21] Appl. No.: 456,804

[52] U.S. Cl. ................................. 423/329; 423/118
[51] Int. Cl. ............................................. C01b 33/28
[58] Field of Search ............ 423/329, 328, 118, 339; 252/455 Z

[56] References Cited
UNITED STATES PATENTS

| | | | |
|---|---|---|---|
| 2,882,244 | 4/1959 | Milton | 423/428 |
| 2,940,830 | 6/1960 | Thornhill | 423/339 |
| 3,130,007 | 4/1964 | Breck | 423/328 |
| 3,250,594 | 5/1966 | Burke et al. | 423/339 |
| 3,425,800 | 2/1969 | Hirsh | 423/329 |
| 3,594,121 | 7/1971 | Weber | 423/328 |
| 3,685,963 | 8/1972 | Schwochow et al. | 423/329 |

Primary Examiner—Edward J. Meros
Attorney, Agent, or Firm—R. G. Miller

[57] ABSTRACT

Reactive amorphous silica having properties suitable for use in the hydrothermal synthesis of zeolite Y is prepared by chemical precipitation of the silica from the waste liquor from a prior zeolite Y synthesis and is employed as a silica source in a subsequent zeolite Y synthesis.

3 Claims, No Drawings

PROCESS FOR PREPARING ZEOLITE Y

The present invention relates in general to a hydrothermal process for preparing zeolite Y and more particularly to such a process which utilizes solid reactive silica derived from waste liquors from previous zeolite synthesis reactions.

Hydrothermal synthesis of zeolite Y is a well-known process and is described in detail in U.S. Pat. 3,130,007, issued Apr. 21, 1964 to D. W. Breck. As disclosed therein, the source of silicon oxide in the reaction mixture for zeolite Y synthesis can be sodium silicate, silica gels, silicic acid, aqueous colloidal silica sols and reactive amorphous solid silicas. The latter two forms of silica are preferred when zeolite Y products having molar $SiO_2/Al_2O_3$ ratios above about 4.5 are to be produced; however, zeolite Y products having $SiO_2/Al_2O_3$ ratios of below about 4.5 can also be prepared using these silica forms. Typical of the group of reactive amorphous solid silicas are fume silicas, chemically-precipitated silicas and precipitated silica sols. Another process, termed "dry-gel," for preparing zeolite Y from reaction mixtures containing solid reactive amorphous silica is described in U.S. Pat. 3,594,121, issued July 20, 1971 to W. W. Weber.

When a reactive amorphous solid silica is employed as the major source of silica, zeolite Y can be prepared by forming an aqueous sodium aluminosilicate mixture having a composition, expressed in terms of moleratios of oxides, which falls within one of the ranges shown in Table I below;

TABLE I

|  | Range 1 | Range 2 | Range 3 | Range 4 |
|---|---|---|---|---|
| $Na_2O/SiO_2$ | 0.20 to 0.40 | 0.41 to 0.60 | 0.61 to 0.80 | 0.30 to 0.36 |
| $SiO_2/Al_2O_3$ | 10 to 40 | 10 to 20 | 7 to 30 | 8.0 to 11 |
| $H_2O/Na_2O$ | 25 to 60 | 20 to 60 | 20 to 60 | 16 to 35 | maintaining the mixture at a temperature in the range of from about 20° to 150°C until crystals are formed, and separating the crystals from the mother liquor.

A preferred composition range for producing zeolite Y when the major source of silica is an aqueous colloidal silica sol or a reactive amorphous solid silica, expressed in terms of oxide-mole-ratios, is shown in Table II.

TABLE II

| | |
|---|---|
| $Na_2O/SiO_2$ | 0.4 to 0.6 |
| $SiO_2/Al_2O_3$ | 10 to 25 |
| $H_2O/Na_2O$ | 20 to 50 |

It is readily apparent from a comparison of the molar ratio of $SiO_2$ to $Al_2O_3$ in the zeolite Y product, i.e. from greater than 3 to about 6, and the $SiO_2/Al_2O_3$ molar ratios of the reaction mixture of the aforesaid composition ranges, that a substantial quantity of silica is not incorporated into the zeolite structure but remains in the waste liquor of the synthesis process. In a plant manufacturing zeolite Y on a commercial scale, discarding the waste liquor in the conventional manner constitutes a considerable waste disposal problem. Moreover, if the means were provided to recover, in suitable form for zeolite Y synthesis, the $SiO_2$ values from this waste liquor, not only would the disposal problem be greatly reduced but also the loss of costly synthesis-grade silica could be greatly decreased.

It has now been found that synthesis-grade solid reactive amorphous silica can be recovered from waste or spent liquors from zeolite Y synthesis and reused in zeolite Y synthesis by supplementing same with sodium silicate and chemically precipitating silica with carbon dioxide under conditions hereinafter specified.

In accordance with the present invention, the process comprises providing spent liquors from a reaction mixture used to prepare zeolite Y, adjusting the $SiO_2$ concentration thereof to 200 to 425 grams per liter, contacting said aggregate mixture with carbon dioxide at temperature of from 75° to 175°C and at pressure of from about 15 to 165 psia, the quantity of carbon dioxide being from 0.5 to 2, preferably 0.5 to 1.4, moles per mole of $Na_2O$ present in the said aggregate mixture, whereby amorphous solid silica is precipitated, and thereafter forming a reaction mixture having a composition expressed in terms of mole-ratios of oxides which falls within one of the ranges set forth in Table I, said precipitated silica constituting a major proportion of the $SiO_2$ content of the reaction mixture thus formed, maintaining the mixture at temperature in the range of about 20° to 150°C until crystals of zeolite Y are formed, and separating the zeolite Y crystals thus formed from the mother liquor.

In accordance with a preferred embodiment of the invention, the process comprises providing spent liquors from a reaction mixture used to prepare zeolite Y, combining therewith an aqueous solution of sodium silicate having a molar $SiO_2/Na_2O$ ratio from 3.5:1 to 1:1 to form an aggregate mixture having an $SiO_2$ concentration of 200 to 425 grams per liter, contacting said aggregate mixture with carbon dioxide at temperature of from 75° to 175°C and at pressure of from about 15 to 165 psia, the quantity of carbon dioxide being from 0.5 to 2, preferably 0.5 to 1.4, moles per mole of $Na_2O$ present in the said aggregate mixture, whereby amorphous solid silica is precipitated, and thereafter forming a reaction mixture having a composition expressed in terms of mole-ratios of oxides which falls within one of the ranges set forth in Table I, said precipitated silica constituting a major proportion of the $SiO_2$ content of the reaction mixture thus formed, maintaining the mixture at temperature in the range of about 20° to 150°C until crystals of zeolite Y are formed, and separating the zeolite Y crystals thus formed from the mother liquor.

The waste liquor from zeolite Y synthesis typically has the following composition:

$SiO_2$ : from 9 to 20 weight-%

$Na_2O$ : from 4 to 6 weight-%

$Al_2O_3$ : from 0.0 to 0.5 weight-%, with the remainder being essentially liquid water. The $Na_2O$ and $SiO_2$ values are largely present as sodium silicate. As a result of the contact and reaction with $CO_2$, the product aqueous silica slurry contains relatively high concentrations of salts such as $Na_2CO_3$ and $NaHCO_3$. It is surprisingly found that these high concentrations of salts do not have any appreciable effect on the utility of the product silica slurry as a source of reactive silica in zeolite Y production. Accordingly, the carbonated $SiO_2$ slurry can be used directly in the preparation of zeolite Y without purification or further treatment such as filtration, washing, drying, grinding and redispersion.

Moreover, the $SiO_2$ produced by the present process is found to have a wide range of surface areas. Despite the fact that surface area controls, in large measure, the reactivity of the $SiO_2$, and hence affects the aging and digestion cycles in zeolite synthesis, good yields of zeolite Y in high purity are readily obtained by the present process.

The particular sodium silicate solution, combined with the waste liquor to raise the $SiO_2$ concentration of the aggregate mixture to at least 200 grams per liter, is not a critical factor, but is preferably one having at least 350 grams $SiO_2$ per liter (wt-%$SiO_2$ usually exceeding about 25) and a $SiO_2/Na_2O$ molar ratio of from about 1 to 3.5. A large number of commerically available sodium silicate compositions are within the aforesaid limits.

The carbon dioxide reactant need not consist of a pure $CO_2$ gas stream, but can comprise any mixture of $CO_2$ with other gases inert toward the constituents of the aggregate mixture. Flue gas, which comprises principally nitrogen, water and $CO_2$ (1–27% by volume) has been found to be entirely satisfactory and convenient for purposes of carrying out the process.

The reaction between the carbon dioxide and the feed mixture can be conducted within a single reaction zone or in multiple reaction zones, i.e., as in a staged reactor. Because of the high concentrations of contained $SiO_2$ in the aggregate feed mixture employed, formation of highly viscous gel-type phases may be observed in the initial stages. Accordingly, it is advantageous to employ intensive mixing techniques, either with the aid of mechanical agitation devices or by the use of intensive gas agitation, or both, to overcome any viscosity effects caused by initial gelation and to thereafter promote precipitation of amorphous solid silica. The ratio of volume (standard cubic feet) of $CO_2$ to weight (pounds) of contained $Na_2O$ in the aggregate sodium silicate-waste liquor feed mixture usually varies between about 3 and 12, depending on the $Na_2O$ concentration therein and the efficiency of $CO_2$ utilization; a typical value is about 6 scf per pound. Continuous contact is maintained within a reaction zone at one or more temperatures in the range of from about 75° to 175°C and pressures of from about 15 to 150 psig. The pH of the reaction mixture is desirably maintained between about 8.5 to 9.6. The duration of the reaction period depends, of course, on the scale of operation.

The product slurry, containing from about 10 to 22 wt% $SiO_2$ can be concentrated by settling or can be filtered if necessary to obtain a cake containing from 23 to 50 wt% $SiO_2$; or, if the product slurry already is sufficiently concentrated, this concentration step is omitted. In the case of filter cake, the product is first sent to a dispersing tank or, if in slurry form, is directed to the zeolite Y reaction vessel for blending with other reactants in the desired ratios; also, for heavier gel compositions, the filter cake may be blended with other reactants in a muller type of mixing device.

In another embodiment of the invention, spent liquors from a reaction mixture used to prepare zeolite Y are reacted and thereafter used as the sole source of silica in a subsequent zeolite Y synthesis, provided that the silica content of such liquors is at least about 200 grams per liter. If the available waste liquor feed has an initial or asreceived concentration of less than about 200 grams per liter, such feed may readily be concentrated by conventional evaporation methods to achieve at least the aforesaid $SiO_2$ concentration level prior to contact with the flue gas/$CO_2$ reactant. The reaction conditions for such contact are again as described hereinabove for aggregate sodium silicate-waste liquor feed mixtures, and the amorphous solid silica produced under such reaction conditions is similarly used directly in the preparation of zeolite Y as described herein.

In accordance with this embodiment, therefore, the process comprises providing, as the sole source of silica, spent liquor from a reaction mixture used to prepare zeolite Y, said liquor having a $SiO_2$ concentration of at least 200 grams per liter, contacting said liquor with carbon dioxide at temperature of from 75° to 175°C and at pressure of from about 15 to 165 psia, the quantity of carbon dioxide being from 0.5 to 2, preferably 0.5 to 1.4, moles per mole $Na_2O$ present in said liquor, whereby amorphous solid silica is precipitated, and thereafter forming a reaction mixture having a composition expressed in terms of mole-ratios of oxides which falls within one of the ranges set forth in Table I, maintaining the mixture at temperature in the range of about 20° to 150°C until crystals of zeolite Y are formed, and separating the zeolite Y crystals thus formed from the mother liquor.

The process is exemplified by the following examples:

Example 1

A reactor was employed which incorporated the basic design of a countercurrent, cylindrical liquid-gas contactor having baffled compartments and efficient mixing. The reactor was 18 inches long and 6 inches in diameter, with two baffles consisting of circular discs located 6 and 12 inches, respectively, from the base of the reactor. Each baffle has a 2 inch diameter hole in the center thereof. To prepare the chemically-precipitated silica, 10 kg. of waste liquor from a crystallizer used in large-scale manufacture of zeolite Y was admixed with 10 kg. of a commercial sodium silicate solution. The waste liquor contained 8.9 weight-% $SiO_2$, 5.0 weight-% $Na_2O$, 0.03 weight-% $Al_2O_3$ and the remainder was water. The commercial sodium silicate solution had a $SiO_2/Na_2O$ weight ratio of 3.22, contained 28.7 weight-% $SiO_2$ and had a density (68°F) of 11.6 lb./gal. The mixture was preheated to about 80°C and fed into the reactor in a direction countercurrent to the direction of feed of $CO_2$. The flow rate of $CO_2$ was maintained at about 100 cubic feet per hour and the residence time of the aggregate sodium silicate-waste liquor feed mixture in the reactor was 14 minutes. The product silica slurry contained 36% solids and had a pH of 9.1. After being allowed to settle for 1 hour, sufficient liquid was decanted to raise the solids content to 47% by weight. The slurry was then used to form a reaction mixture for the preparation of zeolite Y by combination with alumina and sodium hydroxide. The mole-oxide ratios of the resulting reaction mixture were:

$$Na_2O/SiO_2 = 0.36$$
$$SiO_2/Al_2O_3 = 10$$
$$H_2O/Na_2O = 40$$

The reaction mixture was allowed to age at ambient room temperature for 24 hours and then digested and crystallized at 100°C for 49 hours. Zeolite Y product was obtained in good yield and had a crystallinity, by X-ray analysis, of 81%.

Example 2

The reactor described in Example 1 is also used in this example. A 7-gallon batch of waste liquor from a crystallizer used in large-scale manufacture of zeolite Y is first treated in a laboratory steam-jacketed kettle evaporator; the $SiO_2$ concentration is thereby increased from 107 grams/liter to 240 grams/liter. The concentrated feed liquor is preheated to about 80°C and supplied to the reactor in a direction countercurrent to the flow of $CO_2$ reactant gas. Flow rate of $CO_2$ is maintained at about 100 cubic feet per hour. Reaction temperature is kept at 80°C. Residence time in the reactor is 8.5 minutes. Final pH of the product slurry (11.6% solids) is 8.9. By settling and decantation, the solids content is increased to 32% by weight. This slurry is filtered and the filter cake (25.3 wt.% $SiO_2$) is used as the silica source in a reaction mixture for the synthesis of zeolite Y, the mole-oxide ratios of such reaction mixture being:

$$Na_2O/SiO_2 = 0.36$$
$$SiO_2/Al_2O_3 = 10.0$$
$$H_2O/Na_2O = 40.0$$

The reaction mixture is allowed to age at ambient room temperature for 24 hours, and then is digested and crystallized at 100°C for 72 hours. Zeolite Y product is recovered in good yield, with a crystallinity by X-ray analysis of 100%, and by oxygen adsorption, of 98%. The molar $SiO_2/Al_2O_3$ by $a_o$ is 5.2.

What is claimed is:

1. Process for preparing zeolite Y which comprises providing spent liquors from a reaction mixture used to prepare zeolite Y, adjusting the $SiO_2$ concentration thereof to 200 to 425 grams per liter, contacting said aggregate mixture with carbon dioxide at temperature of from 75°C to 175°C and at pressure of from about 15 to 165 psia, the quantity of carbon dioxide being from 0.5 to 2, preferably 0.5 to 1.4 moles per mole of $Na_2O$ present in the said aggregate mixture, whereby amorphous solid silica is precipitated, and thereafter forming a reaction mixture having a composition expressed in terms of mole-ratios of oxides which falls within one of the ranges set forth in Table I, said precipitated silica constituting a major proportion of the $SiO_2$ content of the reaction mixture thus formed, maintaining the mixture at temperature in the range of about 20° to 150°C until crystals of zeolite Y are formed, and separating the zeolite Y crystals thus formed from the mother liquor.

2. Process for preparing zeolite Y which comprises providing spent liquor from a reaction mixture used to prepare zeolite Y, combining therewith an aqueous solution of sodium silicate having a molar $SiO_2/Na_2O$ of from 3.5:1 to 1:1 to form an aggregate mixture having an $SiO_2$ concentration of 200 to 425 grams per liter, contacting said aggregate mixture with carbon dioxide at temperature of from 75° to 175°C and at pressure of from about 15 to 165 psia, the quantity of carbon dioxide being from 0.5 to 2 moles per mole $Na_2O$ present in the said aggregate mixture, whereby amorphous solid silica is precipitated, and thereafter forming a reaction mixture having a composition expressed in terms of mole-ratios of oxides which falls within one of the ranges set forth in Table I, said precipitated silica constituting a major proportion of the $SiO_2$ content of the reaction mixture thus formed, maintaining the mixture at temperature in the range of about 20° to 150°C until crystals of zeolite Y are formed, and separating the zeolite Y crystals thus formed from the mother liquor.

3. Process for preparing zeolite Y which comprises providing spent liquor from a reaction mixture used to prepare zeolite Y, said liquor having a $SiO_2$ concentration of at least 200 grams per liter, contacting said liquor with carbon dioxide at temperature of from 75° to 175°C and at pressure of from about 15 to 165 psia, the quantity of carbon dioxide being from 0.5 to 2 moles per mole $Na_2O$ present in said liquor, whereby amorphous solid silica is precipitated, and thereafter forming a reaction mixture having a composition expressed in terms of mole-ratios of oxides which falls within one of the ranges set forth in Table I, said precipitated silica constituting the sole source of silica in the reaction mixture thus formed, maintaining the mixture at temperature in the range of about 20° to 150°C until crystals of zeolite Y are formed, and separating the zeolite Y crystals thus formed from the mother liquor.

* * * * *